United States Patent [19]

Goto et al.

[11] 4,041,701
[45] Aug. 16, 1977

[54] HYDRAULIC TORQUE CONVERTER WITH A LOCKUP CLUTCH BETWEEN PUMP AND TURBINE

[75] Inventors: Isamu Goto, Kiyose; Sadanori Nishimura, Ohmiya; Eiichiro Kawahara, Tokorozawa, all of Japan

[73] Assignee: Honda Giken Kogyo Kabushiki Kaisha, Tokyo, Japan

[21] Appl. No.: 699,633

[22] Filed: June 24, 1976

[30] Foreign Application Priority Data

June 28, 1975 Japan .................................. 50-80326

[51] Int. Cl.² ............................................. F16D 33/00
[52] U.S. Cl. ...................................... 60/347; 60/349; 60/362; 60/364; 60/367; 192/3.30
[58] Field of Search ................. 60/347, 349, 361, 362, 60/364, 367; 192/3.28, 3.29, 3.30; 74/664

[56] References Cited
U.S. PATENT DOCUMENTS

| | | | |
|---|---|---|---|
| 2,235,673 | 3/1941 | Dodge | 192/3.31 |
| 2,920,728 | 1/1960 | Forster | 192/3.29 |

Primary Examiner—Edgar W. Geoghegan

[57] ABSTRACT

A hydraulically actuated lockup clutch is arranged between the cores of the pump and turbine elements of a torque converter for directly coupling them together for operation above the clutch point. For engagement and disengagement of the lockup clutch, which can be of the multiplate type, the turbine element is moved toward and away from the pump element under the control of a control valve which selectively communicates a clutch actuating chamber within the converter with an external pump assembly and with a fluid drain. Alternatively, a clutch actuating chamber can be formed between the core of the pump or turbine element and a movable pressure plate, so that the latter may travel toward and away from the former for engagement and disengagement of the clutch.

12 Claims, 2 Drawing Figures

HYDRAULIC TORQUE CONVERTER WITH A LOCKUP CLUTCH BETWEEN PUMP AND TURBINE

BACKGROUND OF THE INVENTION

1. Field of the Invention

This invention relates to hydraulic torque converters, and more specifically to means for directly coupling the pump and turbine members of a torque converter so that power may be transmitted therethrough either hydrodynamically or mechanically. The torque converter according to the invention is contemplated for use, for example, in the power trains of motor vehicles including motorcycles.

2. Description of the Prior Art

As is well known, the torque multiplication of a hydraulic torque converter is maximum at zero output speed, that is, when the turbine member is stalled. As the output speed approaches the input or engine speed, the ratio of the output to the input torque falls off until, at a certain ratio of output to input speeds which usually lies between 0.65 and 0.85, the torque becomes unity. This is referred to as the clutch point because under this condition the torque converter acts merely as a fluid coupling or clutch, with no torque conversion and no torque reaction on its stationary reactor member.

Should the speed ratio be allowed to exceed that at the clutch point, the torque ratio would drop below unity and torque reaction on the reactor would be negative. In order to avoid this the mode of operation may be changed from torque conversion either to simple fluid coupling (with the reactor member mounted on a freewheel clutch) or to direct mechanical drive, as at the clutch point. The present invention is directed to the second mentioned alternative.

Heretofore, for providing direct mechanical drive through a torque converter, a clutch has been employed for directly coupling either the input and output shafts, or the pump and turbine members, of the converter. In either case the clutch together with various associated means is located externally of the members or elements of the converter, so that its overall mass is materially increased. Such bulky converters are not suitable for use, for example, on small sized motor vehicles including motorcycles where economy in installation space is of paramount importance.

SUMMARY OF THE INVENTION

It is an object of this invention to provide a hydraulic torque converter with means for selectively providing direct mechanical drive therethrough.

Another object of the invention is to provide a lockup clutch for directly coupling the pump and turbine members of a torque converter, the lockup clutch being completely enclosed by the pump, turbine and reactor members of the converters so that the overall converter size is not increased to the slightest degree by its presence.

A further object of the invention is to provide means for actuating the lockup clutch into positive engagement and positive disengagement so that the torque converter may act as such or as a mechanical coupling exactly as required.

Briefly, the invention is characterized by the arrangement of a lockup clutch for selectively coupling the pump and turbine means of a hydraulic torque converter. This lockup clutch is arranged inside the pump, turbine and reactor means of the converter to keep the size of the converter to a minimum.

In preferred embodiments of this invention, the lockup clutch takes the form of a friction clutch comprising annular drive and driven plates. These clutch plates are operatively mounted in the annular space bounded within a three-element converter by the cores or inner walls of its pump, turbine and reactor elements. This arrangement of the lockup clutch has the additional advantage that, since the clutch is constantly flooded with the hydraulic fluid used as the torque transmitting medium in the converter, the heat generated frictionally by the clutch plates can be readily dissipated.

For engagement and disengagement of the lockup clutch, the turbine element is made movable toward and away from the pump element in the axial direction of the converter in the first embodiment of the invention. Such movement of the turbine element is controlled by a control valve which selectively communicates a clutch actuating chamber within the converter with an external source of fluid pressure and with a fluid drain.

In another embodiment, a clutch actuating chamber is formed between the core of the turbine element, or of the pump element if desired, and an annular pressure plate is movable toward and away from the core. This chamber is also selectively communicated with a fluid pressure source and with a fluid drain by a control valve. In both embodiments, care is taken so that the provision of the lockup clutch with its associated means will not increase the overall size of the converter.

The above and other objects, features and advantages of this invention and the manner of attaining them will become more apparent, and the invention itself will best be understood, upon consideration of the following description taken in connection with the accompanying drawings showing the preferred embodiments of the invention.

DESCRIPTION OF THE PREFERRED EMBODIMENTS

Figure 1:
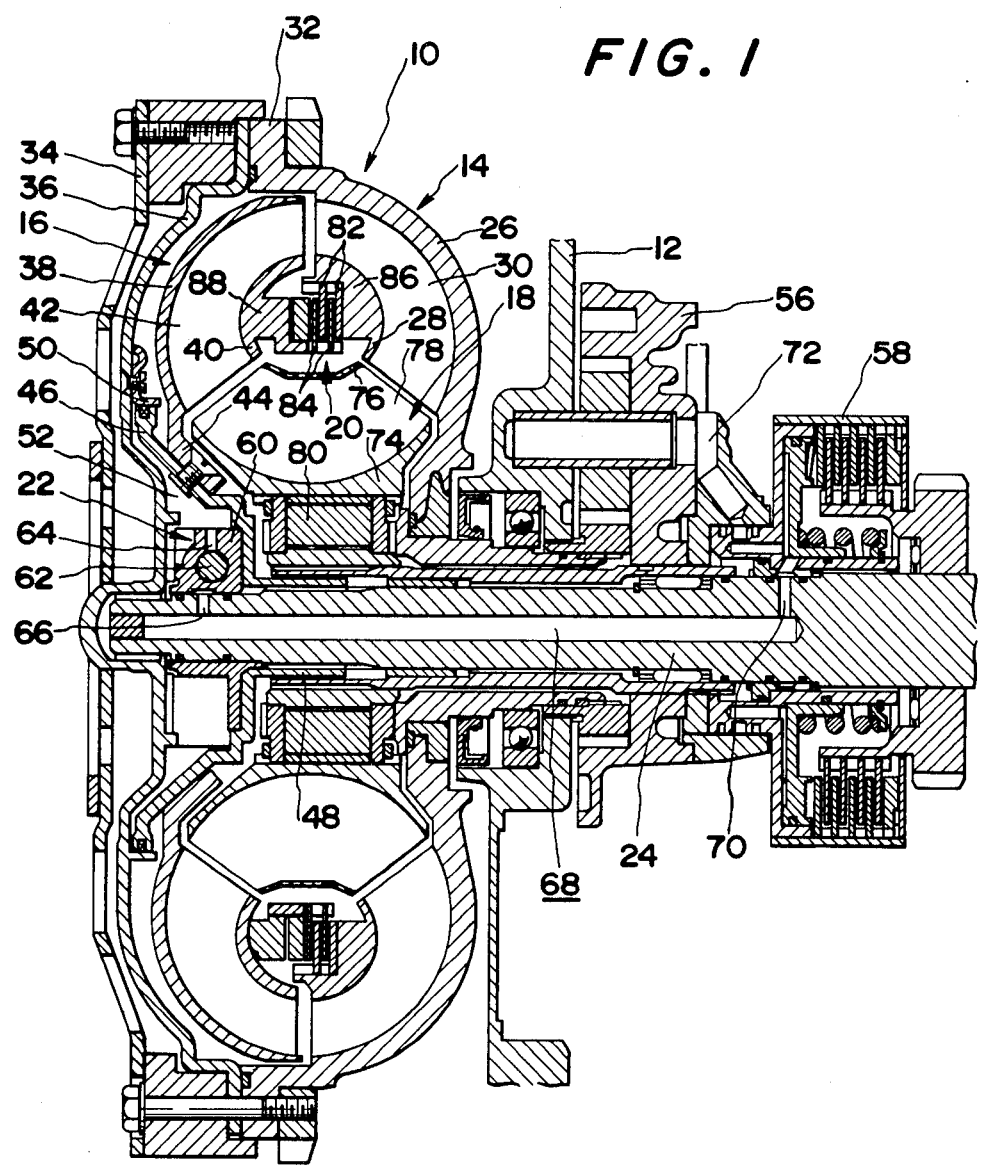
FIG. 1 is an axial sectional view of the hydraulic torque converter embodying the principles of this invention, the converter being shown with its pump and turbine elements declutched for torque conversion.

In FIG. 1 of the drawings, the invention is shown adapted for a three-element, single-stage hydraulic torque converter, generally designated 10, for particular use in a vehicle power train. The torque converter 10 broadly comprises a housing 12, a pump element 14 driven by an engine crankshaft, not shown, a turbine element 16 driven by the pump element through the medium of a fluid, usually oil, a reactor element 18 for redirecting the flow of the fluid from the turbine element back to the pump element for torque and speed transformation, a lockup clutch 20 accommodated in the annular space bounded by the pump, turbine and reactor elements for selectively coupling the pump and turbine elements, and a control valve 22 for actuating the lockup clutch.

The pump element 14, rotatable independently about a converter output shaft 24, comprises a shell 26, a core 28, and a multiplicity of blades 30 therebetween. The shell 26 has a marginal edge 32 to which a drive plate 34 is bolted or otherwise fastened via a flywheel or end cover 36 for connection to the unshown engine crankshaft.

The turbine element 16 likewise comprises a shell 38 and a core 40 with blades 42 therebetween. The shell 38 of the turbine element has an inner edge portion 44 overlapping the reactor element 18, and this inner edge portion is riveted or otherwise fastened to a connector 46 for imparting the rotation of the turbine element to the converter output shaft 24.

Substantially frustoconical in shape, the connector 46 is integrally provided with a sleeve 48 which is splined to the converter output shaft 24 so as to be rotatable simultaneously therewith but slidable back and forth in its axial direction. It is to be noted, therefore, that this connector 46 doubles as a carriage for permitting the turbine element 16 to travel toward and away from the pump element 14 along the axis of the converter.

At its end remote from the sleeve 48, the connector or carriage 46 makes slidable but pressure-tight contact with an annular guide ledge 50 projecting from the flywheel 36. A clutch actuating chamber 52 is thus defined between the flywheel 36 and the connector 46, with the chamber surrounding part of the converter output shaft 24. Hydraulic fluid pressure in this clutch actuating chamber acts upon the connector 46 to cause the turbine element 16 to travel toward the pump element 14.

Occupying part of the clutch actuating chamber 52 is the control valve 22 for controlling fluid communication between the actuating chamber and a source of fluid under pressure such as a pump assembly 56 arranged between the torque converter 10 and a clutch assembly 58 constituting a part of the vehicle transmission. The control valve 22 comprises a valve housing or body 60 mounted on the converter output shaft 24, and a movable closure member 62 within the valve housing.

Normally, the closure member 62 is held, as by a spring, not shown, in such a position relative to the valve housing 60 that the clutch actuating chamber 52 is in communication with drain passages such as those described later with reference to FIG. 2. When actuated, the closure member 62 shifts within the valve housing to such a position that the clutch actuating chamber 52 communicates with the pump assembly 56 by way of an outlet-inlet passage 64 in the valve housing, supply passages 66, 68 and 70 in the converter output shaft 24, and another supply passage 72. The fluid pressure supplied into the clutch actuating chamber causes the turbine element 16 to travel toward the pump element 14 via its carriage, as mentioned previously.

For thus actuating the control valve 22 there may be employed a speed sensitive means adapted to deliver a fluid signal of suitable pressure to the control valve when the output speed builds up to a prescribed degree. For example, said control valve 22 can be actuated to deliver the fluid to the clutch actuating chamber 52 when the speed of turbine 6 reaches a given value.

The reactor element 18 of the torque converter 10 also comprises a shell 74 and a core 76 with blades or guide vanes 78 therebetween. Preferably, this reactor element should be mounted on an overrunning clutch 80 of known construction which permits the reactor element to freewheel with no torque reaction at high speeds.

The lockup clutch 20 between the pump and turbine elements 14 and 16 is shown as a friction clutch of the multiplate type, comprising a set of annular drive plates 82 and a set of annular driven plates 84. The drive plates 82 are non-rotatably but axially slidably supported by support means 86 formed integral with the core 28 of the pump element 14, and the driven plates 84 are likewise supported by support means 88 on the core 40 of the turbine element 16. The drive and driven plates are of course arranged alternately.

In operation, as the vehicle engine is started up, its crankshaft drives the pump element 14 of the torque converter 10 via the drive plate 34 and the flywheel 36. Energy is transferred from the pump element to the hydraulic fluid filled within the converter as the pump builds up speed, and the high energy fluid impinges on the blades 42 of the turbine element 16. Only after sufficient energy has been developed by the pump element, the fluid rotates the turbine element and thus turns the converter output shaft 24 via the connector 46 splined thereto. On leaving the turbine element the fluid passes through the fixed reactor vanes 78 and is thereby redirected back into the pump element.

The foregoing description of torque converter operation is largely conventional and presupposes, of course, that the lockup clutch 20 is disengaged, with the clutch actuating chamber 52 blocked from communication with the pump assembly 56.

When the vehicle picks up speed to such an extent that the torque ratio of the converter drops to the clutch point, for example, the control valve 22 is actuated hydraulically as by the aforesaid speed sensitive means. As a consequence, its closure member 62 is shifted to such a position within the valve housing 60 that the clutch actuating chamber 52 is placed in communication with the pump assembly 56 by way of the outlet-inlet passage 64 and the supply passages 66, 68, 70 and 72.

The fluid pressure in the clutch actuating chamber 52 acts upon the connector 46, causing the same to move rightwardly in the drawing as its sleeve 48 slides over the splined part of the converter output shaft 24. Since this connector or carriage is fastened to the inner edge portion 44 of the turbine shell 38, the turbine element 16 together with the set of driven clutch plates 84 thereon also travels toward the pump element 14, until the driven clutch plates make frictional engagement with the set of drive clutch plates 82 on the pump element.

It should be appreciated that the heat generated upon frictional engagement of the drive and driven clutch plates 82 and 84 presents no problems because the lockup clutch according to the invention is operated wet, by being constantly flooded with the hydraulic fluid within the converter.

With the lockup clutch thus engaged, the pump and turbine elements of the converter are rigidly coupled together, not through the fluid medium. The rotation of the engine crankshaft is therefore mechanically transmitted therethrough to the converter output shaft 24, without any torque or speed transformation.

When the vehicle speed subsequently decreases to a predetermined degree, the closure member 62 of the control valve 22 is permitted to return to its normal position to block communication between clutch actuating chamber 52 and pump assembly 56 and to place the chamber in communication with the fluid drain. With the consequent decrease in the fluid pressure in the clutch actuating chamber 52, the hydraulic fluid flowing through the closed circuit of the converter forces the turbine element 16 away from the pump element 14, so that the lockup clutch 20 is disengaged. Fluid connection is thus re-established between the pump and turbine elements.

The foregoing procedure of operation may be repeated automatically as the vehicle travels at variable speeds, requiring the hydraulic torque converter to operate either as such or simply as a mechanical coupling.

Figure 2:
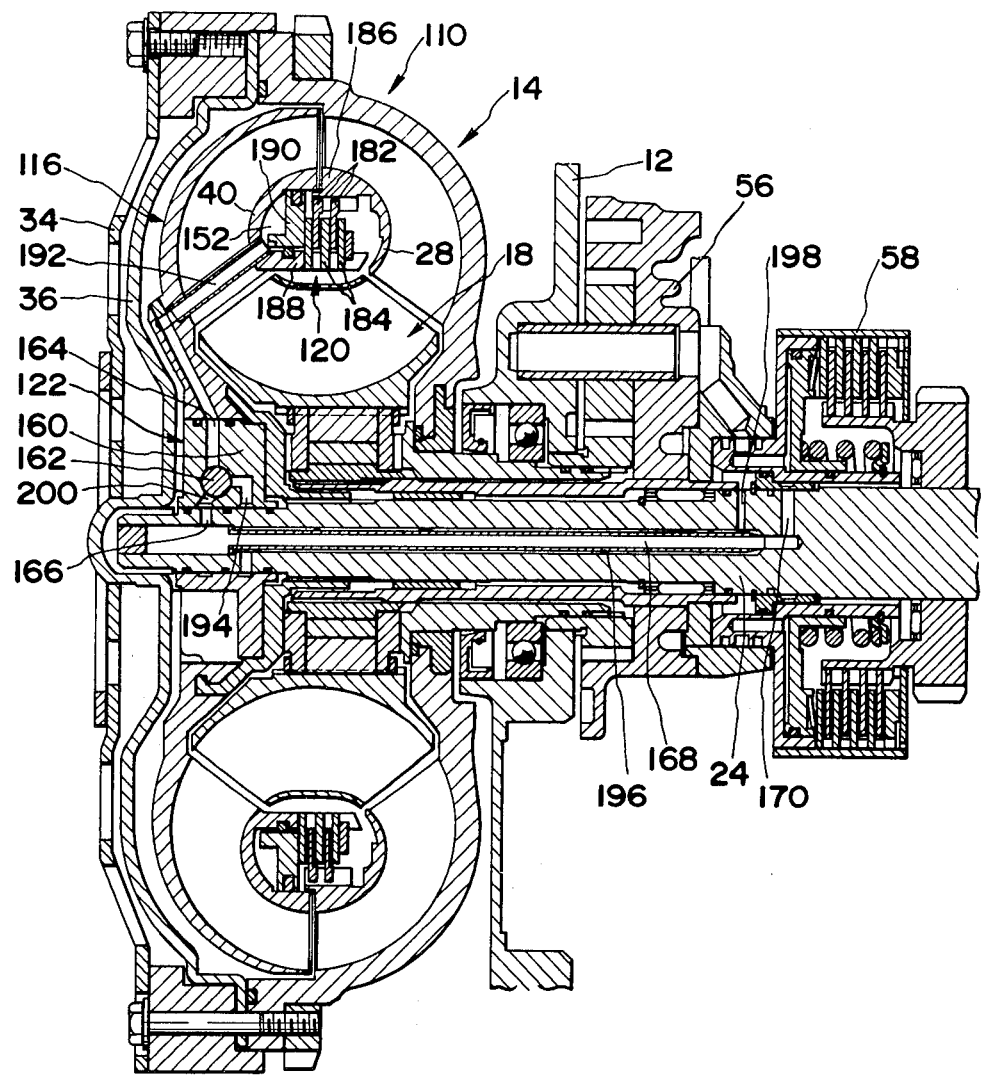
FIG. 2 is a similar view of another preferred embodiment wherein the converter is also shown with its pump and turbine elements declutched.

FIG. 2 illustrates another preferred embodiment of this invention, which comprises a multiplate lockup clutch of slightly different construction, and slightly different means for engagement and disengagement of the lockup clutch. Such modified parts and components are identified by the same reference numerals used to identify the corresponding parts or components, if any, of the preceding embodiment, but with the digit 1 prefixed to such numerals. The other, unmodified parts and components are designated in FIG. 2 by exactly the same reference numerals as those used in FIG. 1, and their description will be omitted.

The hydraulic torque converter of FIG. 2, generally labeled 110, has the modified lockup clutch 120 arranged between the cores of the pump element 14 and a turbine element 116, which turbine element is not movable toward and away from the pump element. The lockup clutch 120 comprises a set of annular drive plates 182 non-rotatably but axially slidably supported by support means 186 formed integral with the pump core 28, and a set of annular driven plates 184 similarly supported by support means 188 formed integral with the turbine core 40. The drive and driven clutch plates are arranged alternately.

Also included in the lockup clutch 120 is an annular pressure plate 190 which is supported by the support means 188 on the turbine core 40 for axial sliding movement toward and away from the pump element 14. The pressure plate 190 cooperates with the turbine core 40 to pressure-tightly define an annular clutch actuating chamber 152 therebetween. Hydraulic fluid pressure in this chamber acts upon the pressure plate 190 to cause the same to move the drive and driven clutch plates 182 and 184 into frictional engagement with each other.

Shown at 122 is a control valve for selectively communicating the clutch actuating chamber 152 with the pump assembly 56 and with the fluid drain. Essentially identical in construction with the control valve 22 of the preceding embodiment, the control valve 122 comprises a valve housing 160 mounted on the converter output shaft 24, and a movable closure member 162 within the valve housing.

Normally, the control valve 122 holds the clutch actuating chamber 152 in communication with the fluid drain by way of a passage 192 in the turbine element, an outlet-inlet passage 164 and drain passage 194 in the valve housing, and drain passages 196 and 198 in the converter output shaft. When actuated the control valve communicates the clutch actuating chamber with the pump assembly 56 by way of the passages 192 and 164, an inlet-outlet passage 200 in the valve housing, supply passages 166, 168 and 170 in the converter output shaft, and supply passage 172.

Thus, when the vehicle picks up speed to such an extent that the torque ratio drops to the clutch point, for example, the control valve 122 is actuated automatically by the aforesaid speed sensitive means to place the clutch actuating chamber 152 in communication with the pump assembly 56. The fluid pressure that has developed in this actuating chamber moves the pressure plate 190 away from the turbine core 40 until the drive and driven plates 182 and 184 of the lockup clutch 120 become frictionally engaged with each other. The converter now has its mode of operation changed from torque conversion to direct mechanical drive.

As the vehicle speed subsequently decreases, the control valve 122 is automatically actuated again to communicate the clutch actuating chamber 152 with the drain passages 194, 196 and 198, with the result that the pressure plate 190 of the lockup clutch 120 releases the drive and driven plates 182 and 184. The turbine element 116 is thereafter driven by the pump element 14 through the fluid medium, with torque conversion. The other details of construction and operation are believed to be clearly apparent from the foregoing decription of FIG. 1.

While the hydraulic torque converter according to this invention has been shown and described hereinbefore in terms of its specific forms, it is understood that the invention itself is not to be restricted by the exact showings in the drawings or the description thereof. For example, in the converter shown in FIG. 2, the clutch actuating chamber may be formed between the pressure plate and the pump core, instead of between the pressure plate and the turbine core, with a corresponding change in the construction of the lockup clutch and in the arrangement of the means for actuating same. It is also recognized that the principles of this invention are applicable to torque converters of other than the illustrated type.

These and other modifications or variations of this invention which will readily occur to those skilled in the art are intended in the foregoing disclosure. The invention is therefore to be accorded the full scope of the following claims.

What is claimed is:

1. In a hydraulic torque converter having pump means, turbine means and reactor means, and an output shaft, the improvement comprising a lockup clutch for directly coupling said pump means and said turbine means, said lockup clutch being accommodated in an annular space bounded by said pump means and said turbine means and said reactor means, a carriage coupled to the output shaft for rotation therewith and for relative axial travel, a flywheel coupled to said pump means for rotation therewith, said flywheel and carriage defining a clutch actuating chamber surrounding said output shaft, said clutch actuating chamber being effective to engage said lockup clutch when supplied with fluid pressure, a source of fluid under pressure, a control valve for selectively communicating said clutch actuating chamber with said source and with a fluid drain, said carriage being displaceable between a retracted and an advanced position corresponding to the connection with the drain or the fluid pressure source, and seal means between said carriage and said flywheel for sealing said clutch actuating chamber to isolate the same from said lockup clutch when the carriage is in retracted position.

2. In a hydraulic torque converter having pump means, turbine means and reactor means, and an output shaft, the improvement comprising carriage means supporting said turbine means for permitting the same to travel toward and away from said pump means along an axis of the torque converter, a lockup clutch for directly coupling said pump means and said turbine means, said lockup clutch being accommodated in an annular space bounded by said pump means and said turbine means and said reactor means, means defining a clutch actuating chamber within the torque converter bounded by said carriage means and surrounding said output shaft, said clutch actuating chamber being effective to cause said turbine means to travel toward said pump means and thus to engage said lockup clutch when supplied with fluid pressure, a source of fluid under pressure, a control valve for selectively communicating said clutch actuating chamber with said source and with a fluid drain, said carriage means being displaceable between a retracted and an advanced position corresponding to the connection with the drain fluid or the pressure sources, and seal means for engaging said carriage means in said retracted position to seal said clutch actuating chamber and isolate the same from said lockup clutch.

3. The improvement of claim 2, wherein said carriage means includes a connector connecting said turbine means to said output shaft to impart the rotation of the former to the latter, said connector being so mounted on said output shaft as to be slidable axially thereof.

4. The improvement of claim 3, wherein the torque converter further includes an end cover to which said pump means is connected, and wherein said connector is adapted to define said clutch actuating chamber between itself and said end cover.

5. The improvement of claim 2, wherein each of said pump and turbine means of the torque converter comprises a shell and a core with a plurality of blades therebetween, and wherein said lockup clutch is a multiplate friction clutch comprising a set of drive plates operatively supported by said core of said pump means and a set of driven plates operatively supported by said core of said turbine means, said drive and driven plates being adapted to move into and out of frictional engagement with each other with the travel of said turbine means toward and away from said pump means.

6. In a hydraulic torque converter having pump means, turbine means and reactor means, the improvement comprising a lockup clutch for directly coupling said pump means and said turbine means, said lockup clutch being accommodated in an annular space bounded by said pump means and said turbine means and said reactor means, means defining a clutch actuating chamber in part of said annular space, said clutch actuating chamber being effective to engage said lockup clutch when supplied with fluid pressure, a source of fluid under pressure, and a control valve for selectively communicating said clutch actuating chamber with said source and with a fluid drain.

7. The improvement of claim 6, wherein each of said pump and turbine means of the torque converter comprises a shell and a core with a plurality of blades therebetween, and wherein said lockup clutch is a friction clutch which includes a pressure plate defining said clutch actuating chamber between itself and said core of either of said pump and turbine means, said pressure plate being movable toward and away from said core for disengagement and engagement of said clutch.

8. The improvement of claim 7, wherein said lockup clutch is a multiplate clutch comprising a set of drive plates operatively supported by said core of said pump means and a set of driven plates operatively supported by said core of said turbine means, said drive and driven plates being adapted to be moved into and out of frictional engagement with each other by said pressure plate.

9. The improvement of claim 1, wherein said control valve communicates said clutch actuating chamber with said source at a predetermined ratio between output and input torques.

10. The improvement of claim 1, wherein said control valve communicates said clutch actuating chamber with source on the revolution of said turbine means reaching up to certain degrees.

11. The improvement of claim 1 wherein said seal means comprises an annular ledge internally secured to said flywheel, and a seal member on said carriage in sealed contact with said ledge with said carriage in retracted position.

12. The improvement of claim 2 wherein said seal means comprises an annular ledge internally secured to said flywheel, and a seal member on said carriage means in sealed contact with said ledge with said carriage means in retracted position.

* * * * *